United States Patent [19]
Saito et al.

[11] Patent Number: 5,381,153
[45] Date of Patent: Jan. 10, 1995

[54] PORTABLE FM-CW RADAR DEVICE WITH FREQUENCY CONVERSION BY FIRST AND SECOND FREQUENCIES

[75] Inventors: Tamio Saito; Teruhisa Ninomiya; Yoji Ohashi; Yoshihiro Kawasaki; Naofumi Okubo; Hiroshi Kurihara, all of Kawasaki; Osamu Isaji, Kobe, all of Japan

[73] Assignees: Fujitsu Limited, Kawasaki; Fujitsu Ten Limited, Kobe, both of Japan

[21] Appl. No.: 183,907

[22] Filed: Jan. 21, 1994

Related U.S. Application Data

[63] Continuation of Ser. No. 925,776, Aug. 7, 1992, abandoned.

[30] Foreign Application Priority Data

Aug. 8, 1991 [JP] Japan ................ 3-223397

[51] Int. Cl.⁶ .............................................. G01S 13/42
[52] U.S. Cl. ...................................... 342/70; 342/109; 342/112; 342/200
[58] Field of Search ............... 342/70, 71, 72, 109, 342/112, 128, 200

[56] References Cited

U.S. PATENT DOCUMENTS

| | | | |
|---|---|---|---|
| 3,823,399 | 7/1974 | Yamanaka | 342/111 |
| 3,846,796 | 11/1974 | Oishi et al. | 342/83 |
| 3,898,655 | 8/1975 | Tresselt | 342/83 |
| 3,952,303 | 4/1976 | Watanabe et al. | 342/112 |
| 3,992,709 | 11/1976 | Watanabe et al. | 342/109 |
| 4,003,049 | 1/1977 | Sterzer et al. | 342/43 |
| 4,011,563 | 3/1977 | Robbi | 342/128 |
| 4,109,247 | 8/1978 | Kaplan | 342/50 |
| 4,115,774 | 9/1978 | Tresselt | 342/174 |
| 4,203,113 | 5/1980 | Baghdady | 342/71 |
| 4,388,622 | 6/1983 | Fletcher, Jr. | 342/112 |
| 4,633,253 | 12/1986 | Stove et al. | 342/162 |
| 4,901,083 | 2/1990 | May et al. | 342/128 |
| 5,021,791 | 6/1991 | Hurd | 342/93 |
| 5,061,933 | 10/1991 | Macomber et al. | 342/128 |
| 5,072,225 | 12/1991 | Eberhardt et al. | 342/200 |
| 5,150,124 | 9/1992 | Moore et al. | 342/68 |
| 5,181,037 | 1/1993 | Komatsu | 342/70 |
| 5,189,427 | 2/1993 | Stove et al. | 342/128 |
| 5,229,774 | 7/1993 | Komatsu | 342/70 |

FOREIGN PATENT DOCUMENTS

| | | |
|---|---|---|
| 1227158 | 8/1960 | France . |
| 1552549 | 1/1969 | France . |
| 3-94322 | 4/1991 | Japan . |
| 4-184184 | 7/1992 | Japan . |

Primary Examiner—John B. Sotomayor
Attorney, Agent, or Firm—Staas & Halsey

[57] ABSTRACT

A FM-CW radar device is provided for frequency-modulating a high frequency signal with a modulation signal, transmitting the modulated high frequency signal, receiving a signal reflected by a target object and frequency-modulating the reflection signal with a signal generated by a local oscillator signal source provided by branching a portion of the transmitting signal. A modulator is disposed between a radar transmitting section and a transmitting antenna. The modulator modulates the transmitting signal with a second frequency which is far lower than the radar transmitting frequency and twice as much as the sum or the difference of a Doppler frequency generated by a relative propagation velocity and a beat frequency generated by a propagation delay time. A first frequency converter frequency modulates the received signal reflected by the target object with the local oscillator. A second frequency converter frequency modulates the received signal with the second frequency, the second frequency being far lower than the radar transmitting frequency and twice as much as the sum or the difference of a Doppler frequency generated by a relative propagation velocity and a beat frequency generated by a propagation delay time.

32 Claims, 14 Drawing Sheets

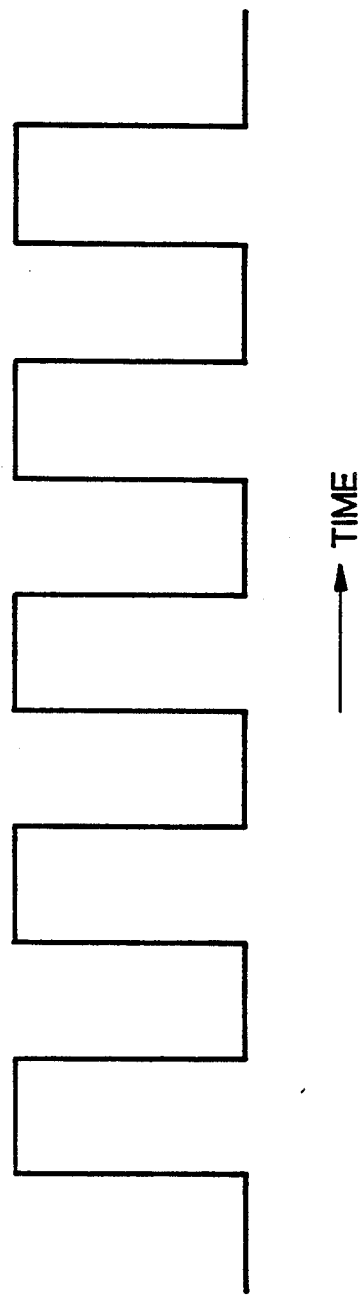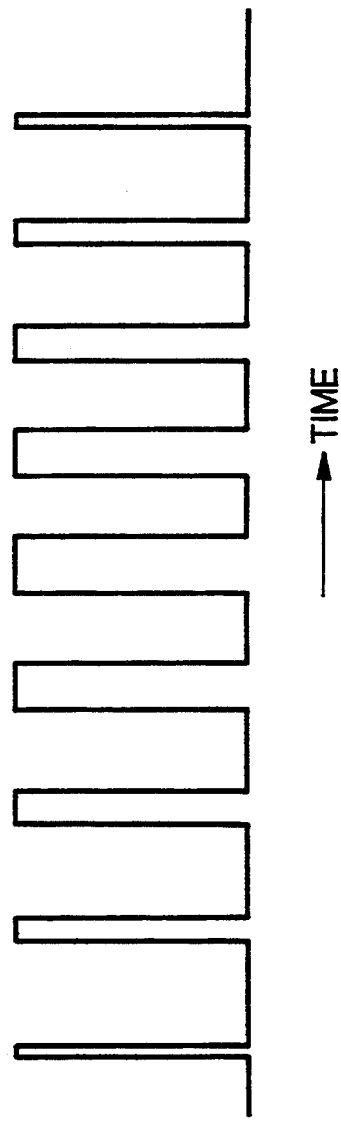

PORTABLE FM-CW RADAR DEVICE WITH FREQUENCY CONVERSION BY FIRST AND SECOND FREQUENCIES

This application is a continuation, of application Ser. No. 07/925,776, filed Aug. 7, 1992, now abandoned.

BACKGROUND OF THE INVENTION

1. Field of the Invention

The present invention relates to a portable FM-CW radar device, more particularly to a device on an automobile which can measure a relative velocity and distance simultaneously with respect to a target object to avoid collision with other automobiles.

2. Description of the Related Art

A frequency-modulating continuous-wave (FM-CW) radar device modulates a high frequency signal, transmits the modulated high frequency signal, receives a reflection signal reflected by a target object, and modulates the frequency of the reflected signal with a signal generated by a local oscillator provided by branching a portion of the transmitted signal.

In recent years, the number of automobiles owned has increased. The number of traffic accidents, such as collision of automobiles, has increased year by year as a result. To reduce the number of traffic accidents, it is necessary to provide an automobile equipped with a safety device of a reasonable cost, for example, an automobile distance monitoring system which allows a driver to determine a potential for collision in advance.

A FM-CW radar system is conventionally used to measure a relative velocity and distance separately with respect to a target object. The above-mentioned radar system can measure the relative velocity and a distance with a simple signal processing circuit, and further a transmitter and receiver for it can be simply constituted.

The aforementioned radar system is used to enable general drivers to prevent collisions between automobiles, so the radar system must be made compact, transportable, and low in cost.

The principle of an FM-CW radar system is as follows. Frequency modulation is conducted on an oscillator by a triangular wave of several hundreds of Hz sent from a modulation signal generator. The frequency-modulated wave is transmitted from a transmitting antenna. A signal reflected from a target object is received by a receiving antenna, and then a frequency changer like a mixer conducts FM-detection on the receiving signal, wherein the frequency-modulation wave is used as a local oscillation signal.

At this time, a deviation of frequency (beat) is caused between the reflected wave sent from the object and the transmitting signal in accordance with the distance between the radar apparatus and the object and also in accordance with a Doppler shift caused by the relative velocity.

The frequency component $f_b$ of this beat is expressed by (Distance frequency $f_r$ dependent on distance)$\pm$(velocity frequency $f_d$ dependent on speed), so the distance and relative velocity can be measured by the deviation of the frequency.

In this case, the following equations are satisfied: $f_r = (4\Delta\Omega/Tc)R$ and $f_d = (2f_0/c)v$, where $\Delta\Omega$ is the modulation width, $T$ is the period of a modulation wave, $c$ is the velocity of light, $R$ is the distance from the radar apparatus to an obstacle (a target object), $f_0$ is the central transmitting frequency, and $v$ is the relative velocity with respect to the obstacle (the object).

In the case where this system is used as radar for automobile use, the measured distance is 100 m at most, and the relative velocity is approximately 100 km/h. In order to ensure a sufficient accuracy of measurement of distance, the maximum frequency deviation must be about 100 Mhz. In order to ensure a sufficient accuracy of measurement of relative velocity, a millimeter wave band must be used for the transmitting frequency band.

Incidentally, in the case of a conventional millimeter wave band FM-CW radar, frequency modulation of a very large amount of frequency deviation is conducted, so that an AM component having approximately the same frequency component as the modulation signal is overlapped with the frequency modulation wave due to the inclination of the characteristics of oscillating frequency versus electric power of a voltage control type of oscillator. This AM component is detected by a mixer. However, the frequency of a triangular wave to frequency-modulate, and the frequency of a reflected signal after frequency modulation of a reflecting wave has been conducted, are very close to each other. Accordingly, the receiving S/N ratio is deteriorated. Therefore, unless the transmitting output is increased, a necessary searching region can not be ensured. For this reason, expensive Impatt diodes and Gunn diodes must be used for the oscillator under present conditions.

SUMMARY OF THE INVENTION

The present invention has been achieved in view of the aforementioned problems. It is a primary object of the present invention to provide a highly efficient FM-CW radar device, which is low in cost and, which has a high temperature stability even when applied to a millimeter band.

In accordance with one aspect of the present invention, there is provided a transportable FM-CW radar device for frequency-modulating a high frequency signal with a modulation signal, transmitting the modulated high frequency signal, receiving a signal reflected by a target object, and frequency-modulating the reflection signal with a signal generated by a local oscillation signal source provided by branching a portion of the transmitting signal, the FM-CW radar device comprising: a modulation means disposed between a radar transmitting section and a transmitting antenna, the modulation means modulating the transmitting signal with a second frequency which is far lower than the radar transmitting frequency and twice as much as the sum or the difference of a Doppler frequency generated by a relative velocity and a beat frequency generated by the propagation delay time, wherein the modulation means modulates the transmitting signal, and the received signal reflected by the target object is frequency-modulated by a first frequency converting means with the local oscillator, and the received signal is frequency-modulated by a second frequency converting means with the second frequency.

In accordance with another aspect of the present invention, there is provided a transportable FM-CW radar device for frequency-modulating a high frequency signal with a modulation signal, transmitting the modulated high frequency signal, receiving a signal reflected by a target object, and frequency-modulating the reflection signal with a signal generated by a local oscillator provided by branching a portion of the transmitting signal, the FM-CW radar device comprising: a modulation means disposed between a radar receiving section and a receiving antenna, the modulation means modulating the transmitting signal with a second frequency which is far lower than the radar transmitting frequency and twice as much as the sum or the difference of a Doppler frequency generated by a relative velocity and a beat frequency generated by the propagation delay time, wherein the modulation means modulates the transmitting signal, a modulated output signal of the modulation means is frequency-modulated by a first frequency converting means with the local oscillator, and the received signal is frequency-modulated by a second frequency converting means with the second frequency.

In accordance with still another aspect of the present invention, there is provided a transportable FM-CW radar device for frequency-modulating a high frequency signal with a modulation signal, transmitting the modulated high frequency signal, receiving a signal reflected by an object, and frequency-modulating the reflection signal with a signal generated by a local oscillation signal source provided by branching a portion of the transmitting signal, the FM-CW radar device comprising: a modulation means disposed between a radar transmitting section and a transmitting antenna, the modulation means modulating the transmitting signal with a second frequency which is far lower than the radar transmitting frequency and twice as much as the sum or the difference of a Doppler frequency generated by a relative velocity and a beat frequency generated by the propagation delay time, wherein the modulation means modulates the transmitting signal; and a switching means disposed between a radar receiving section and a receiving antenna, the switching means conducting a switching operation with the same frequency as the second frequency on the transmission side, wherein the received signal is subjected to gating by the switching means, and the output signal of the switching means subjected to gating is frequency-modulated by a first frequency converting means with the local oscillator and further the received signal is frequency-modulated by a second frequency converting means with the second frequency.

In the FM-CW radar device of the a second embodiment of the invention, a radar signal generated by the voltage control oscillator is modulated by a modulator (for example, the modulation is performed by switching). This output signal is input to a receiver accompanied by a Doppler frequency shift corresponding to the relative velocity between the radar and the target object, and also accompanied by the delay time corresponding to a distance from the radar apparatus the object.

In the receiver, a portion of the output signal is utilized as a local oscillator for frequency converting. This output signal is further frequency-converted by a second frequency converter with the second frequency $f_L$.

In a base band (BB) circuit of the radar, the maximum value of the frequency difference ascribed to the Doppler frequency shift corresponding to the relative velocity with regard to the object, and the maximum value of the frequency difference ascribed to the delay time corresponding to the distance to the object, are prescribed, and the frequencies exceeding the maximum value are removed. Accordingly, the signal (IF signal) including distance and velocity information close to the second frequency $f_L$ is processed. However, demodulation waves (which will be a cause of noise) of the AM component ascribed to the inclination of the frequency versus output power characteristics of oscillator close to DC, and demodulation wave components not less than $2f_L$, are removed by the filter. Consequently, the S/N ratio of the receiver can be improved.

In the case where a radar signal generated by the voltage control oscillator is phase-modulated by the modulator, the spectrum of the output signal is a suppressed carrier signal component $f_t$.

In the FM-CW radar apparatus of a first embodiment of the invention, a radar signal generated by the voltage control oscillator hits the object and is received by the receiving antenna, accompanied by a Doppler frequency shift corresponding to the relative velocity between the radar source and the object, and also accompanied by a frequency difference ascribed to the delay time corresponding to the distance from the radar to the object.

After that, a signal is modulated by the modulator provided between the receiving antenna and a first frequency converter (for example, this modulation is performed by switching).

A spectrum of the received signal modulated by the modulator means can be expressed in the same manner. After that, image processing is conducted in the same manner as the first aspect of the invention described above. Consequently, the S/N ratio of the receiver can be improved.

When the signal is phase-modulated by the modulator in this case, a spectrum of the output signal is also expressed by the spectrum in which the carrier signal component $f_t$ is suppressed.

Further, in the case of the FM-CW radar apparatus of a third embodiment of the invention, a radar signal generated by the voltage control oscillator is modulated by the modulator provided between the voltage control oscillator and the transmitting antenna (for example, the modulation is performed by switching). Then, this output signal hits the target object and is input into the receiver, along with a Doppler frequency shift corresponding to the relative velocity between the radar apparatus and the target object and along with a frequency difference ascribed to the delay time corresponding apparatus to the distance from the radar to the object.

Between the receiving antenna and the first frequency converter, a switching circuit is provided, which can conduct switching synchronously with a modulation signal on the transmission side each time a portion of the signal of the modulation signal generator, which generates a modulation signal sent to the modulator on the transmission side, is branched. Therefore, the switching circuit on the reception side functions as a gating circuit which is operated synchronously with a transmission signal. That is, the switching circuit receives the signal only when a signal is sent from the transmission side. It does not receive other external signals.

Accordingly, signal components entering from the outside are not detected as noise. Therefore, the S/N ratio of the receiver can be further improved.

A modulation signal composed of a rectangular wave of a 50% duty can be also used, and a rectangular FM wave can be used for the output of the modulation signal generator. Further, in the case where the rectangular FM wave is used for the output of the modulation signal generator, the frequency (the period) of the frequency modulation wave can be changed.

Unnecessary frequency components can be removed from a signal input into the second frequency converter by a band pass filter, which allows the second frequency to pass and is provided between the first frequency converter which conducts frequency conversion on a receiving signal by a local oscillator, and the second frequency converter which carries out frequency conversion by the second frequency.

Further, it is also possible to allow only the fundamental frequency component of a signal generated in the modulation signal generator to pass through the band pass filter provided between the modulation signal generator and the second frequency converter.

When an isolator is inserted between the voltage control oscillator and the modulator, the impedance on the output side of the voltage control oscillator is maintained constant.

Further, when the isolator is inserted between the modulation means and the first frequency converter, the input impedance of the first frequency converter is maintained constant.

When the switching circuit is structured to be a balance type, the input and output impedance of the switching circuit can be maintained constant.

BRIEF DESCRIPTION OF THE DRAWINGS

FIG. 14 is a waveform diagram of a modulating signal;

FIG. 15 is a waveform diagram of a modulating signal by means of a second frequency.

DETAILED DESCRIPTION OF THE PREFERRED EMBODIMENTS

Before describing the preferred embodiments, a prior art FM-CW radar system will be described with reference to FIGS. 1 to 3.

Figure 1:
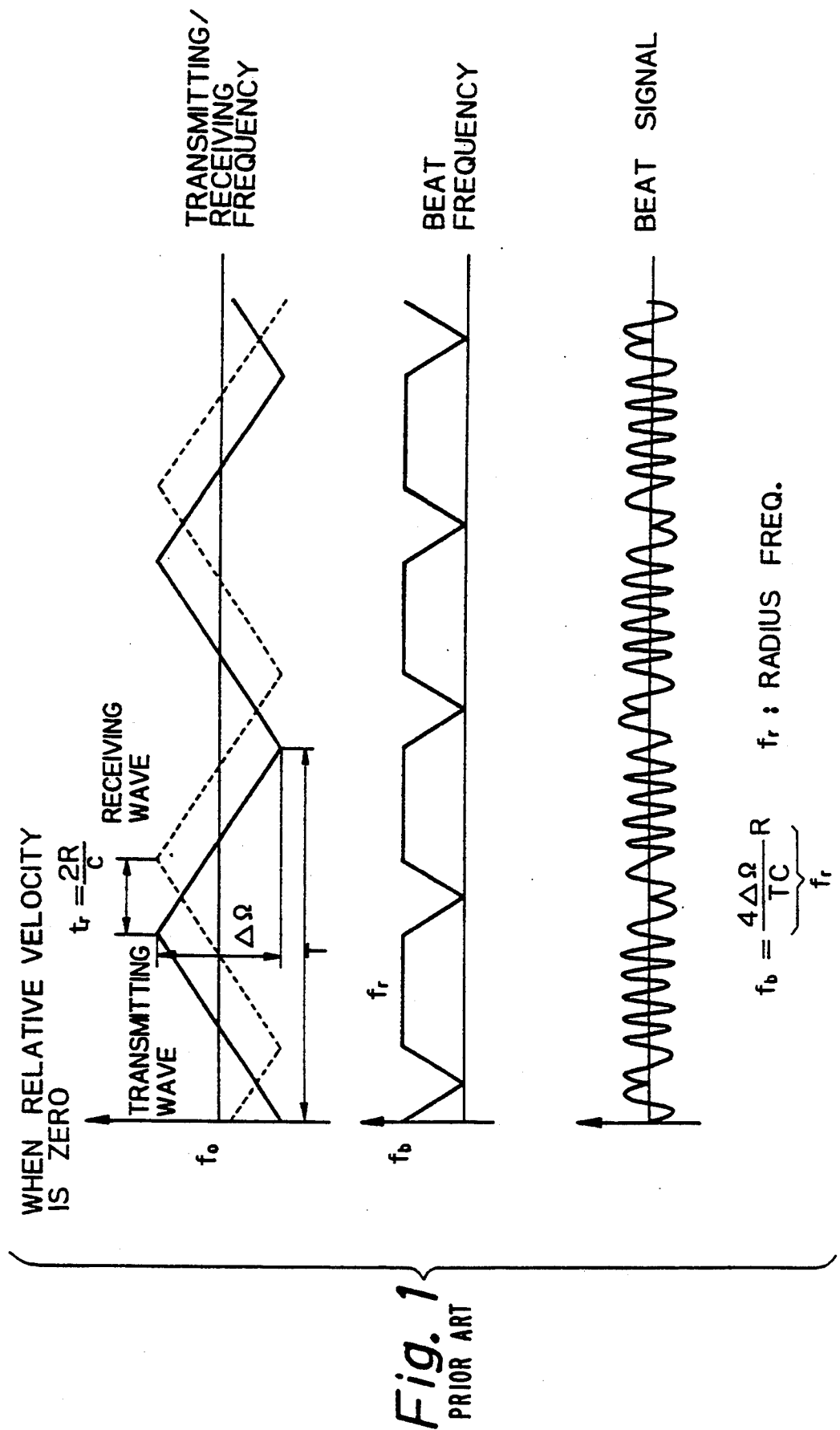
FIGS. 1 and 2 are waveform views showing the operational principle of a prior art FM-CW radar system.
Figure 2:
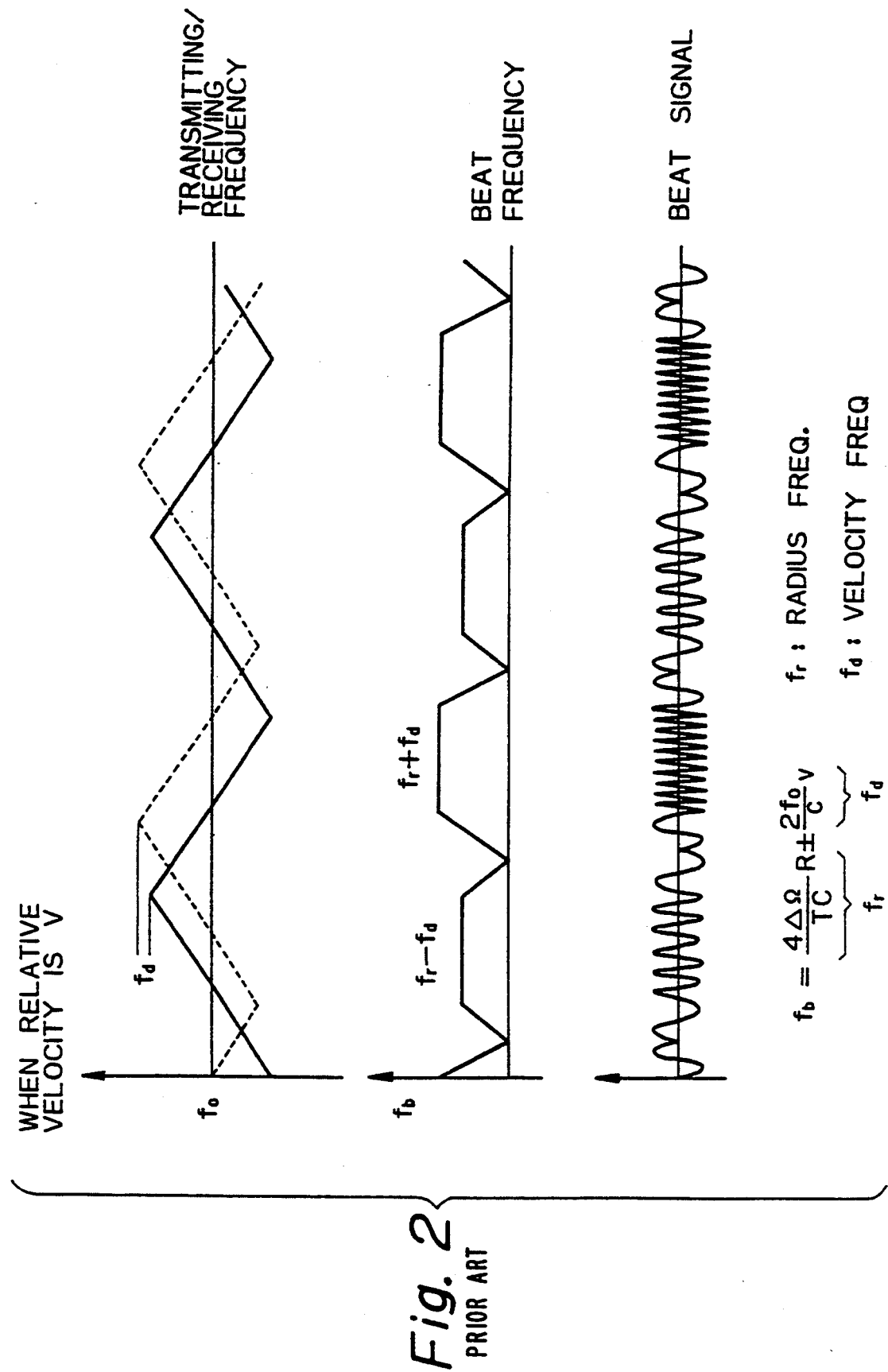
Figure 3:
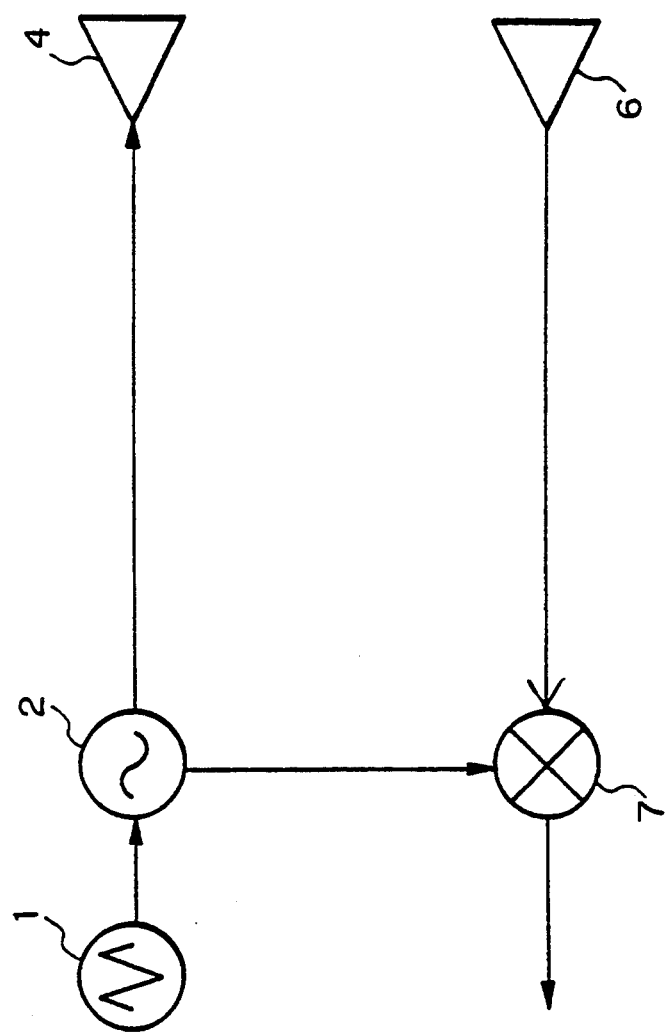
FIG. 3 is a view showing the configuration of a conventional FM-CW radar apparatus.

FIGS. 1 and 2 show the principle of a prior art FM-CW radar system, and FIG. 3 shows the structure of a conventional FM-CW radar apparatus.

The principle of an FM-CW radar system is as follows. That is, as shown in FIG. 3, frequency modulation is conducted on an oscillator 2 by a triangular wave of several hundred Hz sent from a modulation signal generator 1, so that a frequency-modulation wave is transmitted from a transmitting antenna 4. A reflected signal sent from an object is received by a receiving antenna 6, and then a frequency changer 7 like a mixer conducts FM-detection on the received signal, wherein the frequency-modulation wave is used as a local oscillation signal.

At this time, as shown in FIGS. 1 and 2, deviation of frequency (beat) is caused between the reflected wave sent from the target object and the transmitting signal in accordance with the distance between the radar apparatus and the object, and also in accordance with a Doppler shift caused by relative velocity.

Since the frequency component $f_b$ of this beat is expressed by (Distance frequency $f_r$ dependent on distance)±(velocity frequency $f_d$ dependent on speed), the distance and relative velocity can be measured by the deviation of the frequency.

In this case, the following equations are satisfied: $f_r=(4\Delta\Omega/Tc)R$ and $f_d=(2f_0/c)v$, where $\Delta\Omega$ is the modulation width, T is the period of a modulation wave, c is the apparatus velocity of light, R is the distance from the radar to an obstacle (an object), $f_0$ is the central transmitting frequency, and v is the relative velocity with respect to the obstacle (the object).

In the case where this system is used as a radar apparatus for automobile use, the measured distance is 100 m at most, and the relative velocity is approximately 100 km/h. In order to ensure a sufficient accuracy of measurement of distance the maximum frequency deviation must be about 100 MHz, and in order to ensure a sufficient accuracy of measurement of relative velocity, a millimeter wave band must be used for the transmitting frequency band.

Embodiments of the present invention will be explained in detail with reference to the attached drawings.

Figure 4:
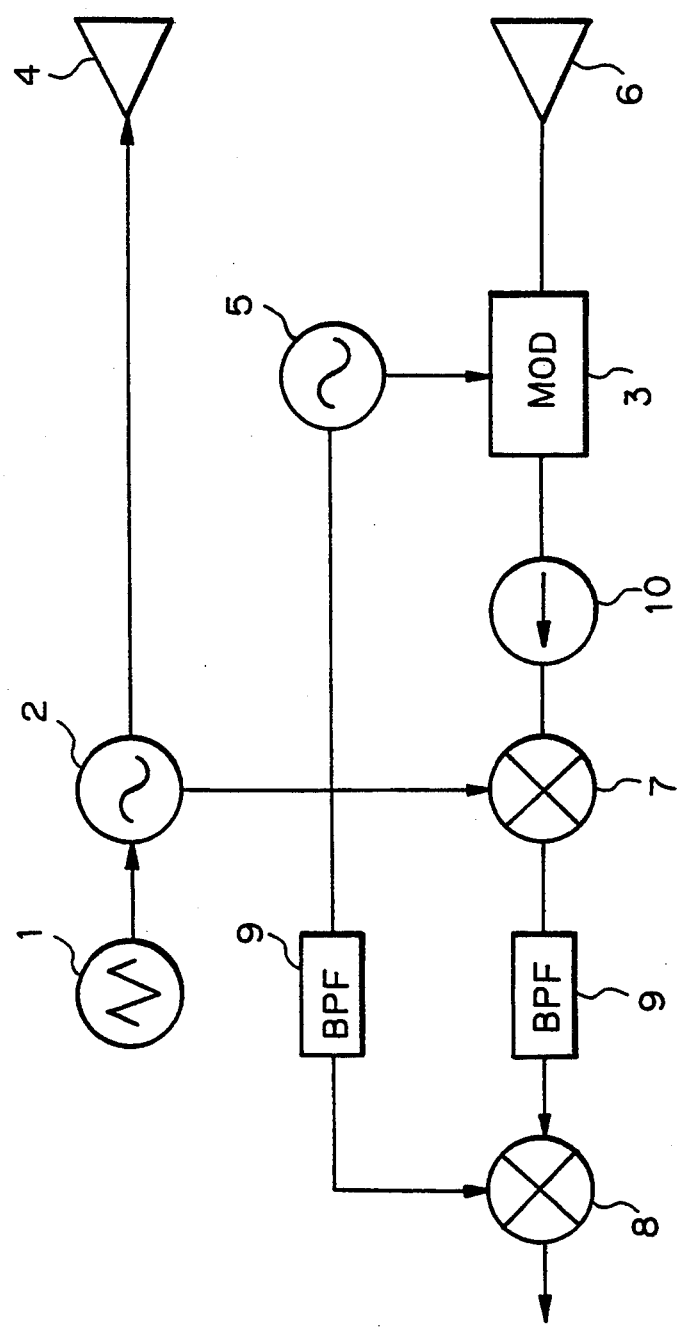
FIG. 4 is a block diagram showing the operational principle of an embodiment of the present invention.

FIG. 4 is a block diagram showing a first embodiment of the present invention where like elements have like reference numerals. The FM-CW radar apparatus according to this embodiment of the invention provides a modulator 3 disposed between a radar receiving section and a receiving antenna 6. The modulator 3 modulates the transmitting signal with a second frequency which is far lower than the radar transmitting frequency and twice as much as the sum or the difference of a Doppler frequency generated by the relative velocity and a beat frequency generated by the propagation delay time. A modulated output signal of the modulator 3 is frequency-modulated by a first frequency converter 7 with the local oscillator and further the receiving signal is frequency-modulated by the second frequency converter 8 with the second frequency.

In this case, the isolator 10 is provided between the modulator 3 and the first frequency converter 7 in order to maintain the impedance of the circuit constant.

Figure 5:
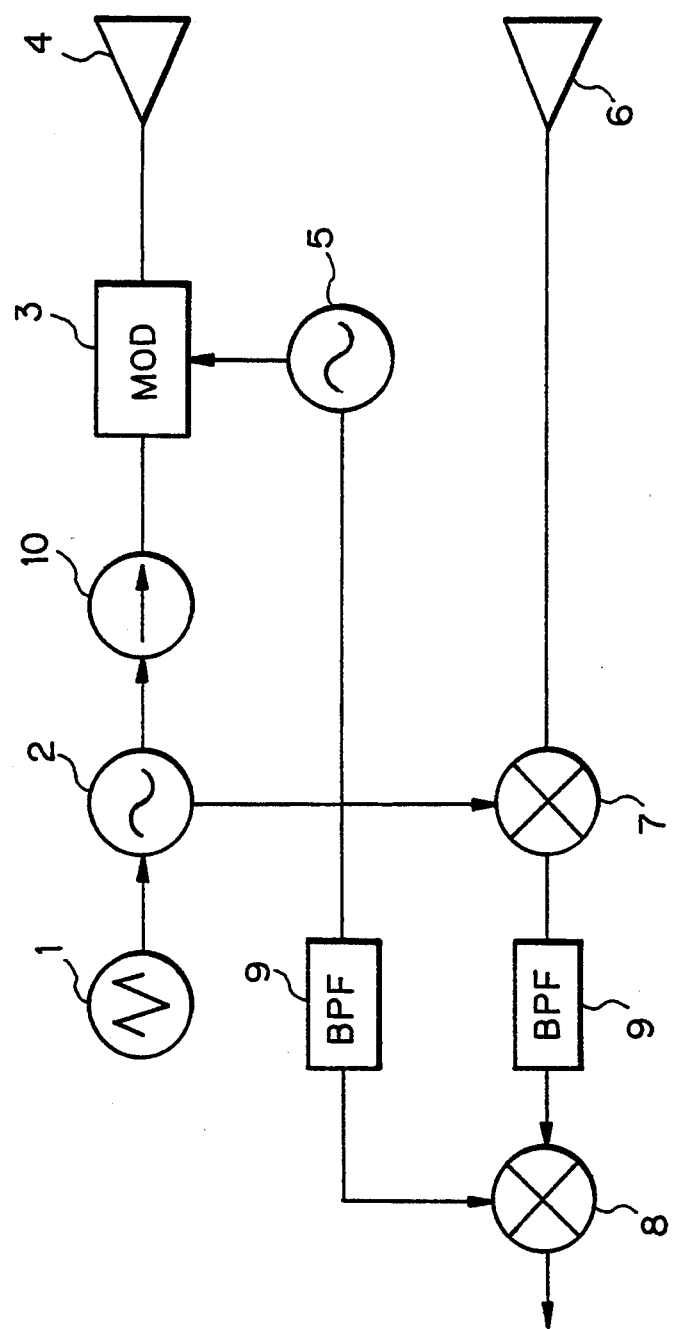
FIG. 5 is a block diagram showing the operation of another embodiment of the present invention.

FIG. 5 is a block diagram showing a second embodiment of the present invention. This modulation signal generator 1 generates a triangular wave signal for frequency modulation. A voltage control oscillator 2 generates a frequency-modulation signal of a millimeter band which is output from the radar.

A modulator 3 modulates a signal given by the voltage control oscillator 2 with a modulation signal generated by a modulation signal generator 5. In more detail, the modulator 3 modulates the transmitting signal with a second frequency which is far lower than the radar transmitting frequency and twice as much as the sum or the difference of a Doppler frequency generated by the relative velocity and a beat frequency generated by the propagation delay time. The modulator 3 can include a switch which is switched by the second frequency, for example). A transmitting antenna 4 effectively emits a signal output by the modulator 3 into the air.

A modulation signal generator 5 generates a modulation signal which is used for modulating a signal in the modulator 3.

A receiving antenna 6 effectively receives a signal reflected by an object.

A first frequency converting means 7 generates a necessary signal when a signal of the voltage control oscillator 2 and a signal received by the receiving antenna 6 are mixed.

A second frequency converter 8 mixes a signal output from the first frequency converter 7 and a signal generated in the modulation signal generator 5 and generates a signal component containing the relative velocity and distance between the object and the radar.

A band pass filter 9 passes the frequency which is the same as the modulation signal frequency (the second frequency) generated by the modulation signal generator 5.

An isolator 10 (a circulator) is provided between the voltage control oscillator 2 and the modulator 3 in order to maintain the impedance of the circuit constant.

Figure 6:
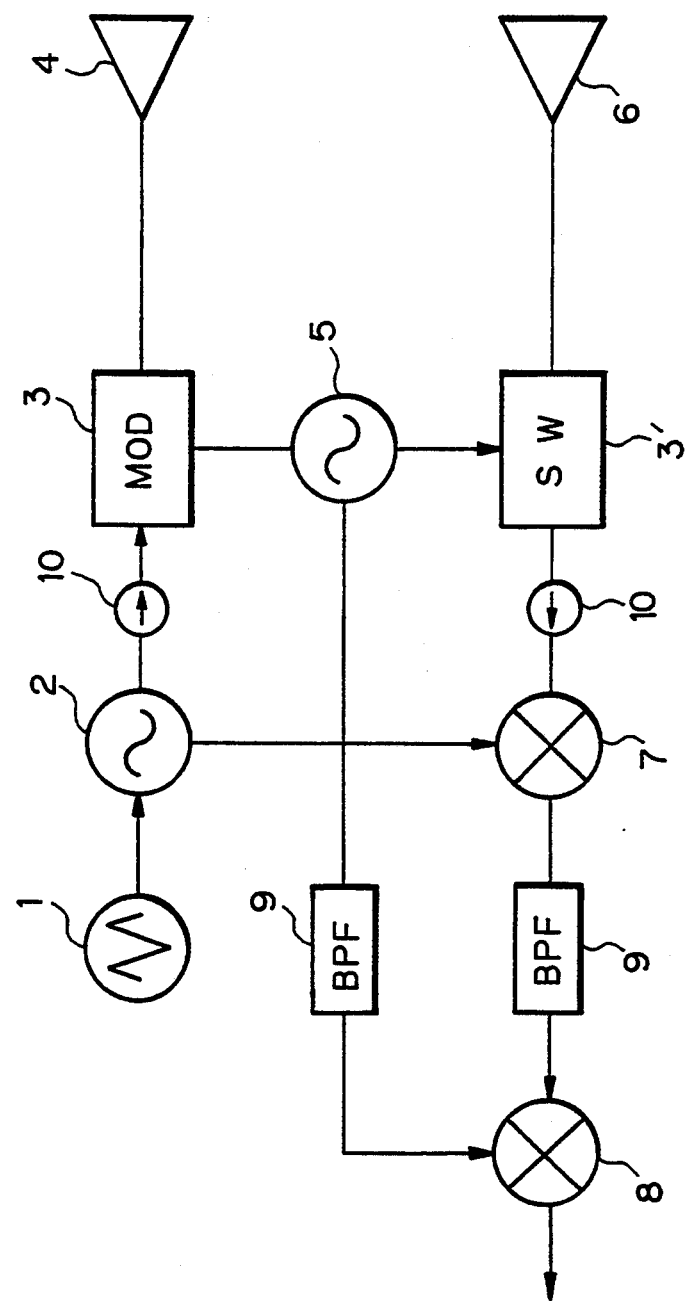
FIG. 6 is a block diagram showing the operation of still another embodiment of the present invention.

FIG. 6 is a block diagram showing a third embodiment of the present invention. The FM-CW radar apparatus according to this embodiment of the invention provides a modulator 3 disposed between a radar transmitting section and a transmitting antenna 4. The modulator 3 modulates the transmitting signal with a second frequency which is far lower than the radar transmitting frequency and twice as much as the sum or the difference of a Doppler frequency generated by a relative velocity and a beat frequency generated by the propagation delay time. A switching circuit 3' is disposed between a radar receiving section and a receiving antenna 6. The switching circuit 3' conducts a switching operation with the same frequency as the second frequency on the transmission side so that the receiving signal is gated by the switching circuit 3'. A first frequency converter 7 frequency modulates the gated output signal of the switching circuit 3' with the local oscillator. A second frequency converter 8 frequency modulates the receiving signal with the second frequency.

An isolator 10 may be inserted between the modulator 3 and the transmitting section, and the isolator 10 may be inserted between the switching circuit 3' and the first frequency converter 7.

Like elements are shown by like reference numerals 1, 2, 5, and 7 to 9 and function in the same manner as in FIGS. 4 and 5. Accordingly, the detailed explanations are omitted here.

In each of the aforementioned embodiment of the invention, it is preferable that the second frequency of a rectangular wave of about 50% duty is used as a modulation signal. Further, it is preferable that a rectangular frequency-modulated wave is used as a modulation signal. Further, it is possible that the period of the rectangular frequency-modulated wave used as the second frequency be changed. Furthermore, it is preferable the switching means be structured to be a balance type of switching means.

Figure 7:
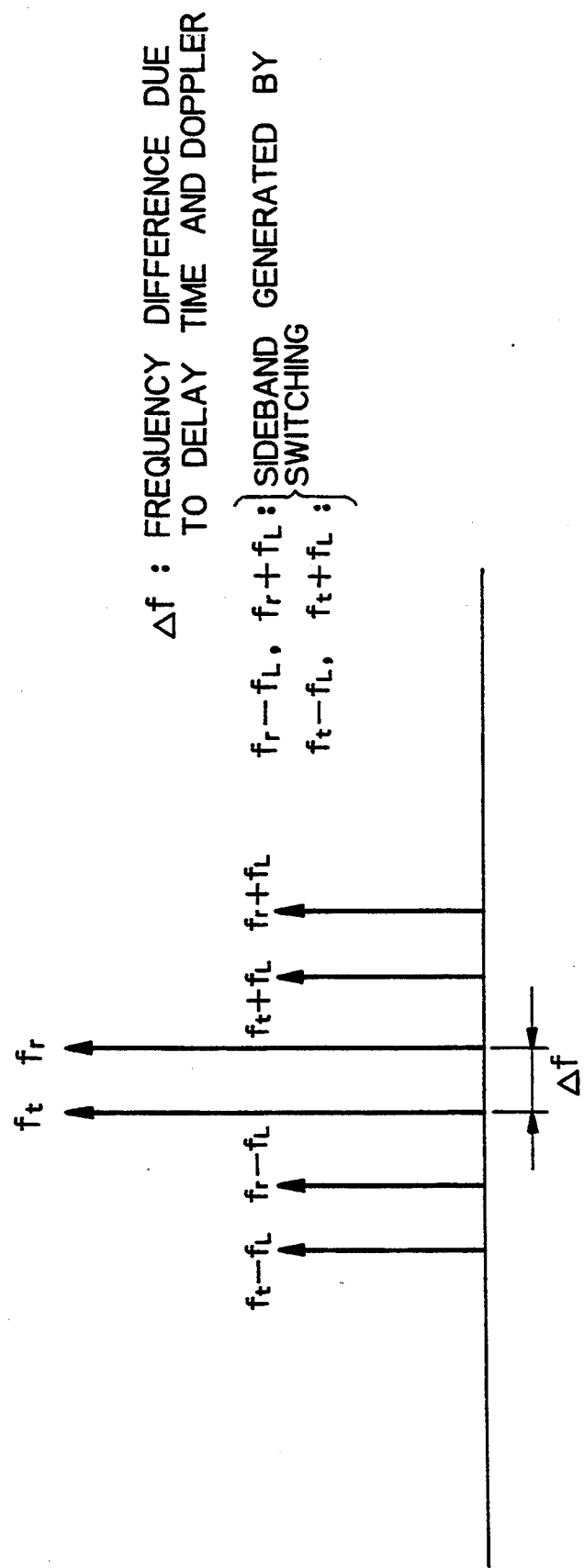
FIG. 7 is a view showing a spectrum of output signals.

As shown in FIG. 5, in the FM-CW radar apparatus of the aforementioned second embodiment of the invention, a radar signal generated by the voltage control oscillator 2 is modulated by the modulator 3 (for example, the modulation can be performed by means of switching). FIG. 7 shows the spectrum of the output signal, for example, of the second embodiment of FIG. 5. This output signal is input into a receiver along with a Doppler frequency shift corresponding to the relative velocity between the radar and the object and also along with the delay time corresponding to a distance from the radar apparatus to the object.

Figure 8:
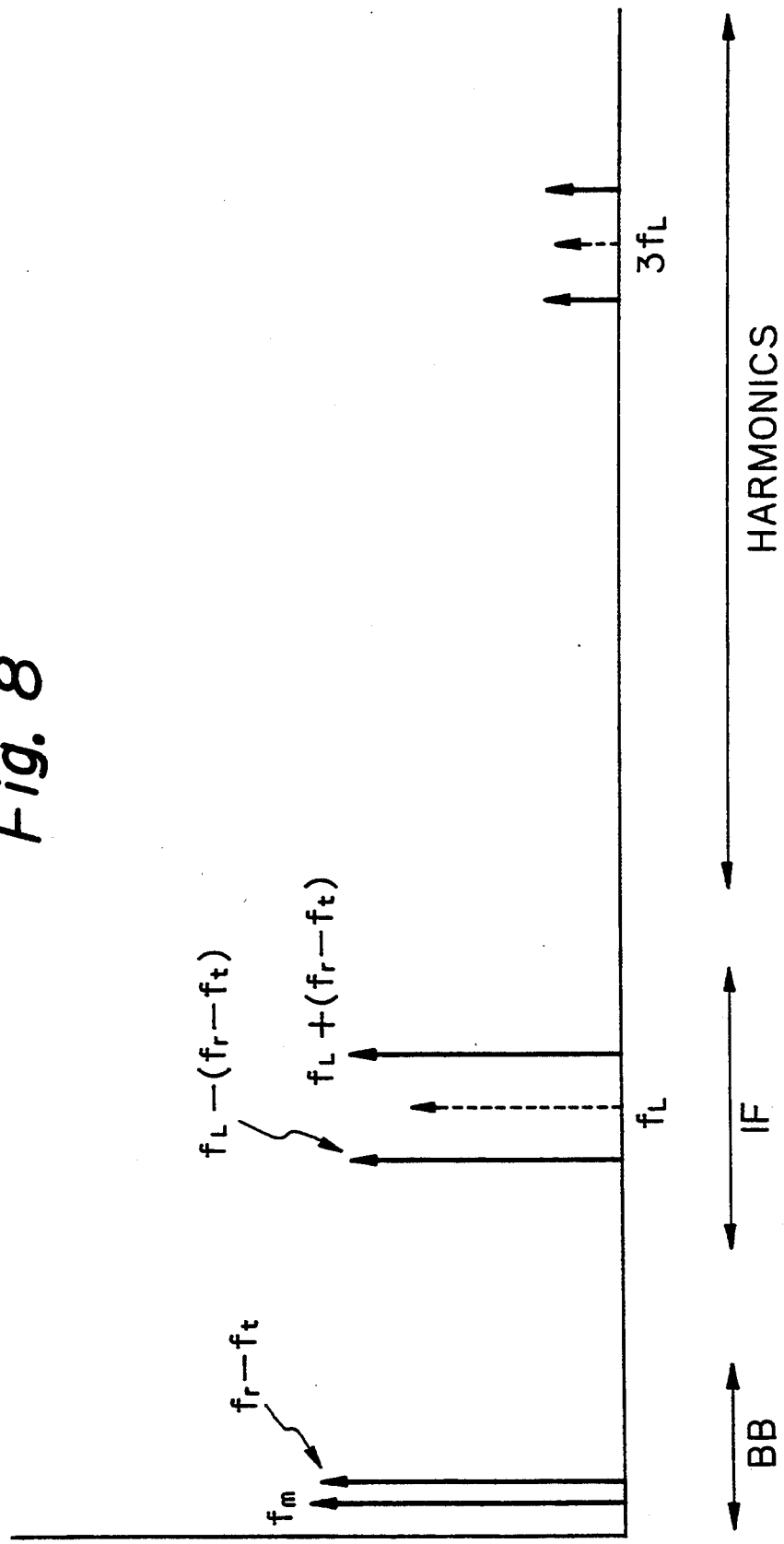
FIG. 8 is a view showing a spectrum of an output of first frequency converter.

In the receiver, a portion of the output signal is utilized as a local oscillator for frequency converting, so that the output spectrum of the first frequency converter 7 is shown in FIG. 8. This output signal is further frequency-changed by the second frequency converter 8 with the second frequency $f_L$.

In a base band (BB) circuit of the radar, the maximum value of the frequency difference ascribed to the Doppler frequency shift corresponding to the relative velocity with regard to the object, and the maximum value of the frequency difference ascribed to the delay time corresponding to the distance to the object, are prescribed, and the frequencies exceeding the maximum value are removed. Accordingly, the signal (IF signal) including distance and velocity information close to the second frequency $f_L$ is processed. However, demodulation waves (which will be a cause of noise) of the AM component ascribed to the inclination of the frequency versus output power characteristics of the oscillator close to DC, and demodulation wave components not less than $2f_L$, are removed by the filter. Consequently, the S/N ratio of the receiver can be improved.

In the case where a radar signal generated by the voltage control oscillator 2 is phase-modulated by the modulator 3, the spectrum of the output signal is shown in FIG. 7, in which the carrier signal component $f_t$ is suppressed.

As shown in FIG. 4, in the FM-CW radar apparatus of the first embodiment of the invention, a radar signal generated by the voltage control oscillator 2 strikes the object and is received by the receiving antenna 6, along with a Doppler frequency shift corresponding to the relative velocity between the radar apparatus and the object and along with a frequency difference ascribed to the delay time corresponding to the distance from the radar apparatus to the object.

After that, the signal is modulated by the modulator 3 provided between the receiving antenna 6 and the first frequency converter 7 (for example, this modulation can be performed by switching).

The spectrum of the received signal modulated by the modulator 3 can be expressed in the same manner as shown in FIG. 7. After that, image processing is conducted in the same manner as the first aspect of the invention described above. Consequently, the S/N ratio of the receiver can be improved.

When the signal is phase-modulated by the modulator 3 in this case, a frequency spectrum of the output signal is also expressed by the spectrum shown in FIG. 7, in which the carrier signal component $f_t$ is suppressed.

As shown in FIG. 6, in the case of the FM-CW radar apparatus of the third embodiment of the invention, radar signal generated by the voltage control oscillator 2 is modulated by the modulator 3 provided between the voltage control oscillator 2 and the transmitting antenna 4 (for example, the modulation can be performed by switching).

Then, this output signal strikes the target object and is input into the receiver, along with a Doppler frequency shift corresponding to the relative velocity between the radar apparatus and the object and along with a frequency difference ascribed to the delay time corresponding to the distance from the radar apparatus to the object.

Between the receiving antenna 6 and the first frequency converter 7, the switching means 3' is provided which can conduct switching synchronously with a modulation signal on the transmission side at each time a portion of the signal of the modulation signal generator 5, which generates a modulation signal sent to the modulator 3 on the transmission side is branched. Therefore, the switching circuit 3' on the reception side functions as a gating circuit which is operated synchronously with a transmission signal. That is, the switching circuit 3' receives the signal, only when a signal is sent from the transmission side. It does not receive other external signals.

Accordingly, signal components entering from the outside are not detected as noise. Therefore, the S/N ratio of the receiver can be further improved.

A modulation signal composed of a rectangular of wave a 50% duty can be also used, and a rectangular FM wave can be used for the output of the modulation signal generator 5. Further, in the case where the rectangular FM wave is used for the output of the modulation signal generator 5, the frequency (the period) of the frequency modulation wave can be changed.

Unnecessary frequency components can be removed from a signal input into the second frequency converter 8 by a band pass filter 9 which allows the second frequency to pass and is provided between the first frequency changing means 7 which conducts frequency changing on a received signal by a local oscillator, and the frequency converter 8 which conducts frequency converting by the second frequency.

Further, it is also possible to allow only the fundamental frequency component of a signal generated in the modulation signal generator 5 to pass through the band pass filter 9 provided between the modulation signal generator 5 and the second frequency converter 8.

When an isolator 10 is inserted between the voltage control oscillator 2 and the modulator 3, the impedance on the output side of the voltage control oscillator 2 is maintained constant.

Further, when the isolator 10 is inserted between the modulator 3 and the first frequency converter 7, the input impedance of the first frequency converter 7 is maintained constant.

When the switching circuit is structured to be a balance type, the input and output impedance of the switching circuit can be maintained constant.

The details of embodiments of the present invention will be explained as follows.

(a) Further explanation of the first embodiment

Figure 10:
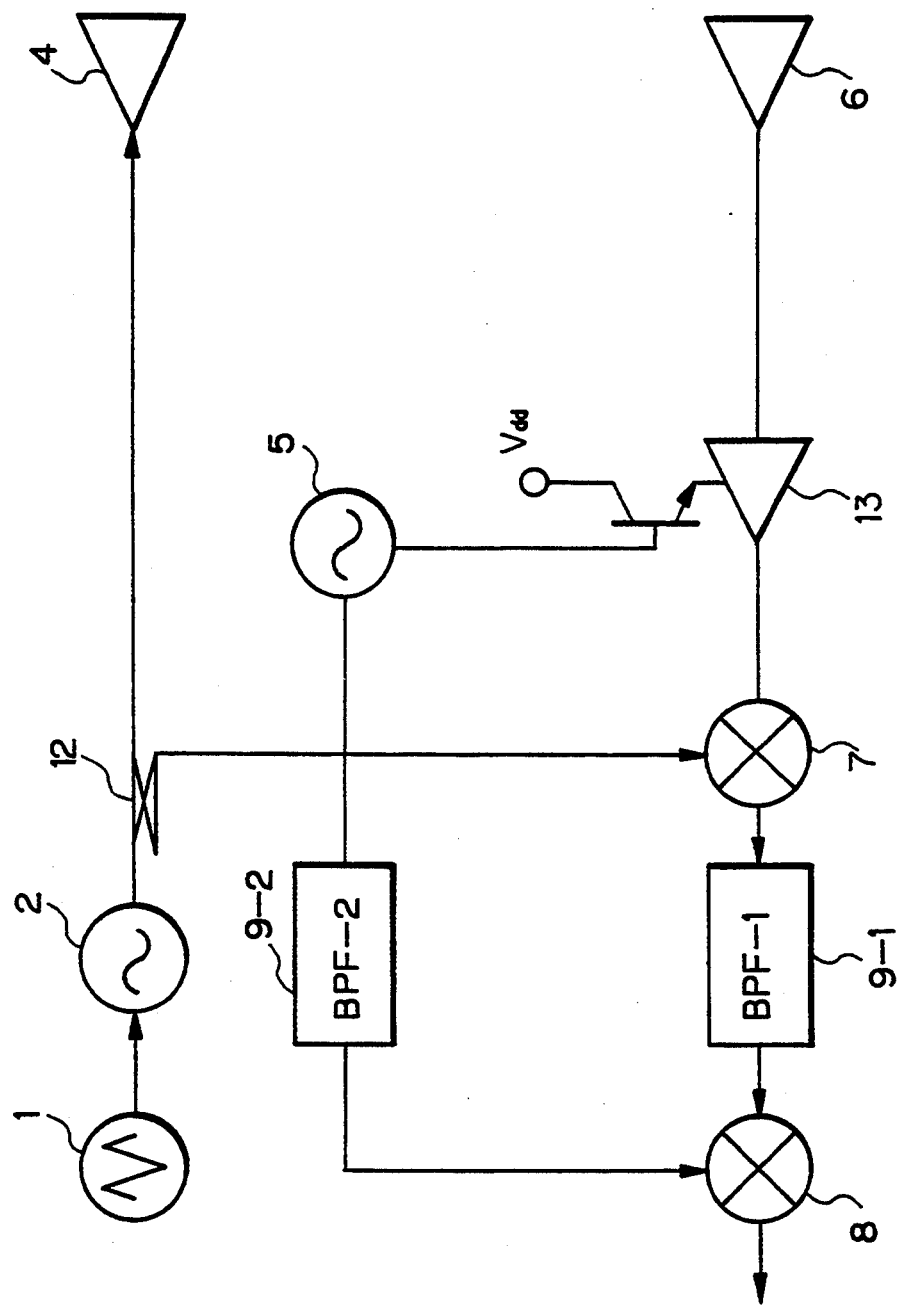
FIG. 10 is a block diagram showing another embodiment of the present invention.

FIG. 10 is a block diagram showing the first embodiment of the present invention. The transmission system of the FM-CW radar apparatus shown in FIG. 10 includes a modulation signal generator 1, voltage control oscillator 2, directional coupler 12, and transmission antenna 4. The reception system includes a receiving antenna 6, low noise amplifier 13, first frequency converter 7, band pass filter 9-1, and second frequency converter 8. The control system includes a modulation signal generator 5 and a band pass filter 9-2.

The modulation signal generator 1 generates a triangular wave signal for frequency modulation. The voltage control oscillator 2 generates a frequency-modulated signal of a millimeter band which is output from the radar.

The directional coupler 12 takes out a signal sent from the voltage control oscillator 2 to the transmitting antenna 4 as well as to the first frequency converter 7 so as to be used for a local oscillating wave.

The transmitting antenna 4 effectively emits a signal output from the modulator means 3, and the receiving antenna 6 effectively receives a signal reflected by an object.

The low noise amplifier 13 is an amplitude-modulator which conducts amplitude-modulation with a signal having the second frequency which is far lower than the radar transmission frequency sent from the modulation signal generator 5, and which is not less than twice as much as the frequency of the sum or difference of a Doppler frequency generated by the relative velocity and a beat frequency generated by the propagation delay time. The low noise amplifier 13 also functions as an isolator (a circulator) which maintains the impedance of the circuit constant.

The first frequency converter 7 generates a necessary signal when a signal of the voltage control oscillator 2 taken out by the directional coupler 12 and a signal received by the receiving antenna 6 are mixed.

The second frequency converter 8 mixes a signal output from the first frequency converter 7 and a signal generated by the modulation signal generator 5 and generates a signal component which contains the relative velocity and distance with respect to the object and the radar.

The band pass filter 9-1 allows to pass the same frequency as the modulation signal frequency (the second frequency) which is generated by the modulation signal generator 5. This band pass filter 9-1 is provided between the first frequency converter 7 which changes the frequency of a receiving signal by a local oscillator, and the second frequency converter 8 which changes the frequency by the second frequency.

The modulation signal generator 5 generates a modulation signal (a signal having the second frequency) which is used for modulating a signal by the low noise amplifier 13.

The band pass filter 9-2 also allows to pass the same frequency as the modulation signal frequency (the second frequency) generated by the modulation signal generator 5. This band pass filter 9-2 is inserted between the modulation signal generator 5 and the second frequency converter 8.

The FM-CW radar apparatus having the aforementioned structure is operated in the following manner.

First, in order to conduct frequency modulation, a triangular wave generated by the modulation signal generator 1 is input into the voltage control oscillator 2. The output waveform of the generated signal wave is expressed as follows.

$$(1+A) \sin [\omega_r t + \int s(t)dt] \quad (1)$$

where $(1+A)$ is an amplitude, $\omega_r = 2\pi f_0$, and $\int s(t)dt$ is a triangular modulation amount.

This output signal is emitted from the transmitting antenna 4. When the relative velocity is zero, the waveform which has returned from the object is delayed correspondingly to the distance between the radar apparatus and the object, further attenuated in the air, and input into the receiving antenna 6.

The input reflecting wave is processed in such a manner that a drain current of the low noise amplifier 13 corresponding to the AM modulation means is modulated with a rectangular wave generated by the amplitude modulation signal generator 5. The waveform output at that time is expressed as follows.

$$\alpha(1+A)(1+B) \sin [\omega_r(t-\tau) + \int s(t-\tau)dt] \quad (2)$$

where $\alpha$ is a constant which is determined when consideration is given to the gain of the transmitting and receiving antennas, the attenuation in the air, and the gain of the low noise amplifier, and $(1+B)$ is an amplitude modulation component.

Suppose that $\omega_r t = \Omega_1 t$, $\omega_r(t-\tau) = \Omega_2 t$, $\int s(t)dt = \phi_1$, and $\int s(t-\tau)dt = \phi_2$. Then, the formulas (1) and (2) are expressed as follows.

$$(1+A) \sin (\Omega_1 t + \phi_1) \quad (3)$$

$$\alpha(1+A)(1+B) \sin (\Omega_2 t + \phi_2) \quad (4)$$

In the first frequency converter 7, an output wave of the low noise amplifier 13 of the amplitude modulation means and an frequency-modulated output wave of the voltage control oscillator 2 are mixed. Accordingly, the frequency component can be expressed as follows.

$$\{(1+A) \sin (\Omega_1 t + \phi_1) + \alpha(1+A)(1+B) \sin (\Omega_2 t + \phi_2)\}^2 \quad (5)$$

From formula (5), the output signal of the first frequency converter 7 is expressed as follows.

$$(1+A)^2/2 + \alpha^2(1+A)^2(1+B)^2/2 + \alpha^2(1+A)^2 \times (1+B)/2 \times \cos\{(\Omega_1 - \Omega_2)t + (\phi_1 + \phi_2)\} \quad (6)$$

When only the signals close to the second frequency component B are allowed to pass by the band pass filters 9-1, 9-2 and the signals are frequency-modulated by the second frequency changer 8 with the second frequency B, only the component expressed by the following formula can be taken out as a signal.

$$S_{det} = \alpha^2 B(1+A)^2/2 + [\alpha^2 B(1+A)^2/2 - ]\cos\{(\Omega_1 - \Omega_2)t + (\phi_1 + \phi_2)\} \quad (7)$$

In the above formula, the first term corresponds to a noise component of a detection signal, and the second term corresponds to a signal component.

When an investigation is made into a conventional FM-CW radar apparatus, the frequency component of the first frequency converter 7 is expressed as follows.

$$\{(1+A)\sin(\Omega_1 t + \phi_1) + \alpha(1+A)\sin(\Omega_2 t + \phi_2)\}^2 \quad (8)$$

From formula (8), a frequency component output by the first frequency converter 7 is expressed as follows.

$$S_{det} = (1+A)^2(1+\alpha^2)/2 + [\alpha(1+A)^2 - ]\cos\{(\Omega_1 - \Omega_2)t + (\phi_1 + \phi_2)\} \quad (9)$$

In the above formula, the first term corresponds to a noise component of a detection signal, and the second term corresponds to a signal component.

When a comparison is made between the noise component of formula (7) and that of formula (9), the noise component of formula (7) is much smaller than that of formula (9) since $\alpha << 1$ in general.

Consequently, according to the circuit of this embodiment, the FM-CW radar apparatus comprises: a low noise amplifier 13 disposed between the radar receiving section and the receiving antenna 6, the low noise amplifier 13 modulating the transmitting signal with the second frequency which is far lower than the radar transmitting frequency and twice as much as the sum or the difference of a Doppler frequency generated by the relative velocity and the beat frequency generated by the propagation delay time, wherein the low noise amplifier 13 modulates the receiving signal, and the modulated output signal of the low noise amplifier 13 is frequency-modulated by the first frequency converter 7 with the local oscillator and further the receiving signal is frequency-modulated by the second frequency converter 8 with the second frequency. Accordingly, a radar apparatus, with as S/N ratio better than that of a conventional FM-CW radar apparatus can be realized.

The band pass filter 9-1 which allows the second frequency to pass is provided between the first frequency converter 7 which changes the frequency of a receiving signal by the local oscillator and the frequency converter 8 which changes the frequency of the receiving signal by the second frequency. By the aforementioned band pass filter 9-1, unnecessary frequency components are removed from the signal input into the second frequency converter 8. Due to the foregoing, noise which is caused by unnecessary frequency components when frequency changing is conducted by the second frequency converter 8 can be reduced.

Further, only the fundamental frequency component of the signal generated by the modulation signal generator 5 is allowed to pass through the band pass filter 9-2 provided between the modulation signal generator 5 and the second frequency changer 8. Therefore, the occurrence of noise which is caused by frequency components other than the fundamental wave generated by the modulation signal generator 5 can be conduced.

(b) Further explanation of the second embodiment

Figure 9:
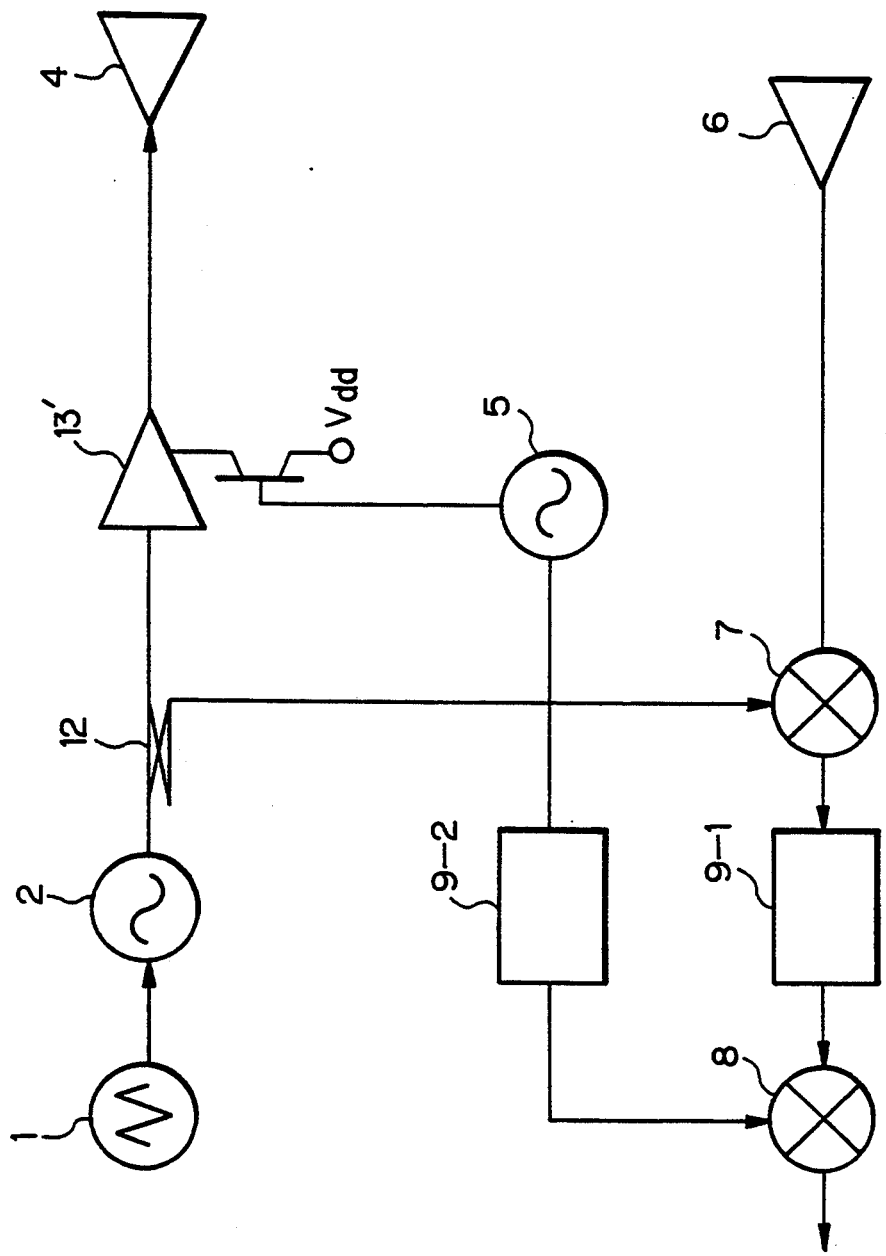
FIG. 9 is a block diagram showing an embodiment of the present invention.

FIG. 9 is a block diagram showing the second embodiment of the present invention. The transmission system of the FM-CW radar apparatus shown in FIG. 9 includes a modulation signal generator 1, voltage control oscillator 2, directional coupler 12, electric power amplifier 13', and transmission antenna 4. The reception system includes a receiving antenna 6, first frequency converter 7, band pass filter 9-1, and second frequency converter 8. The control system includes a modulation signal generator 5 and band pass filter 9-2.

In this second embodiment, between the radar transmitting section and the transmitting antenna 4, there is provided the electric power amplifier 13' which is modulated by the second frequency and by which the transmitting signal is modulated, wherein the second frequency is far lower than the radar transmitting frequency and not less than twice as much as the sum or difference of a Doppler frequency caused by the relative velocity and a beat frequency caused by the propagation delay time. The transmitting signal is modulated by this electric power amplifier 13'. The received signal reflected by the object is frequency-converted by the first frequency converter 7 with the local oscillator, and further the signal is frequency-converted by the second frequency converter 8 with the second frequency.

As shown in the above structure, this second embodiment is a case in which the amplitude modulator (the electric power amplifier) 13' is provided on the transmission side. Even when the aforementioned structure is adopted, the same effect as that of the first embodiment, such as improvement in the S/N ratio, can be provided due to the same principle as the first embodiment.

(c) Further explanation of the third embodiment

Figure 11:
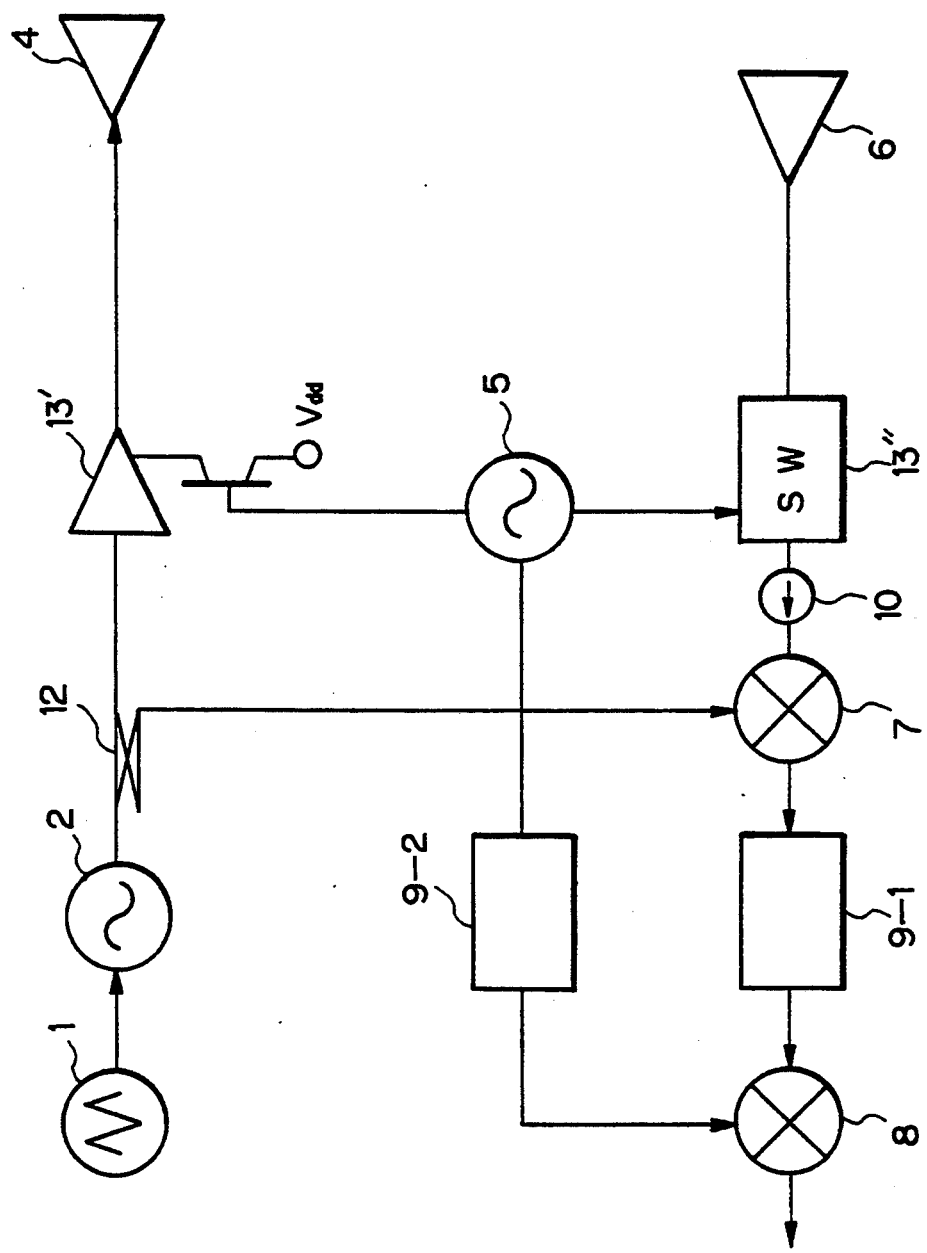
FIG. 11 is a block diagram showing still another embodiment of the present invention.

FIG. 11 is a block diagram showing the third embodiment of the present invention. The transmitting system of the FM-CW radar apparatus shown in FIG. 11 includes a modulation signal generator 1, voltage control oscillator 2, direction coupler 12, electric power amplifier 13', and transmitting antenna 4. The receiving system includes a receiving antenna 6, switch means 13", isolator (circulator) 10, first frequency converter 7, band pass filter 9-1, and second frequency converter 8. The control system includes a modulation signal generator 5 and band pass filter 9-2.

In the third embodiment, between the radar transmitting section and the transmitting antenna 4, the electric power amplifier 13' is provided which is modulated by the second frequency, wherein the second frequency is far lower than the radar transmitting frequency and not less than twice as much as the sum or difference of a Doppler frequency caused by the relative velocity and a beat frequency caused by the propagation delay time. The transmitting signal is modulated by this electric power amplifier 13'. The switching circuit 13" which conducts switching by the same frequency as the second frequency on the transmission side is provided between the radar receiving section and the receiving antenna 6. A receiving signal is subjected to gating by the switching circuit 13", and the output signal of the switching means 13" which has been subjected to gating is input into the first frequency converter 7 through the isolator 10. Then, the signal is frequency-changed by the first frequency converter 7 with a local oscillator, and further the signal is frequency-changed by the second frequency converter 8 with the second frequency.

Figure 12:
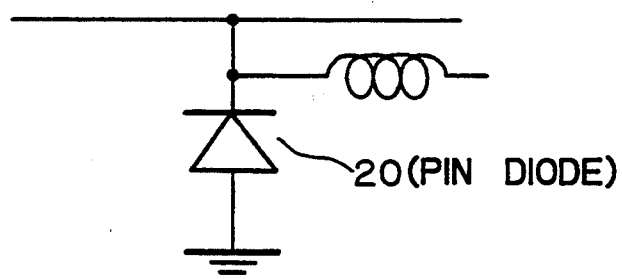
FIG. 12 is a view showing a switching circuit using a PIN diode.

For example, one of the specific elements to compose the switching circuit 13" is the PIN diode 20 shown in FIG. 12, or the switching circuit 13" is realized when a drain current (a drain voltage) of a three terminal element of GaAs, MESFET (metal semiconductor FET), or HEMT (high electron mobility transistor) is switched.

Figure 16:
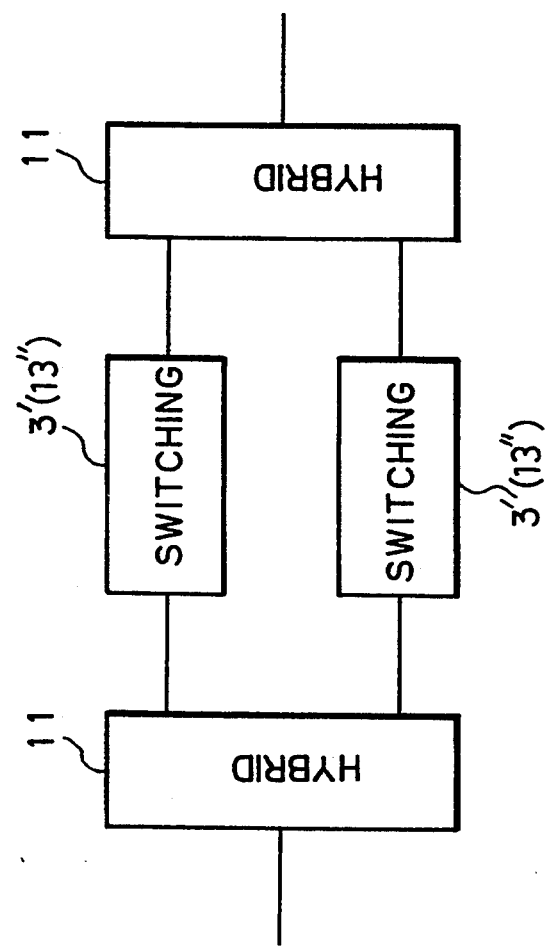
FIG. 16 is a block diagram showing a balanced-switching circuit.

As shown in FIG. 16, a balance type of switching means may be adopted in which two switching circuit 13" are connected by hybrids 11 so that the input and output impedance of the switching circuit 13" is maintained constant. When the aforementioned structure is provided, the change of impedance of the switching circuit 13" does not affect the oscillation characteristics of the voltage control oscillator 2, so that the fluctuation of oscillation frequency of the voltage control oscillator 2, which is caused by the change of impedance of the switching circuit 13", and the fluctuation of output voltage can be reduced. Further, the fluctuation of frequency changing characteristics of the frequency converter which is caused when the impedance of the switching circuit 13" is changed can be reduced.

The isolator (circulator) 10 maintains the input impedance of the first frequency converter 7 constant. When the isolator 10 is provided, the fluctuation of frequency changing characteristics of the frequency converter which is caused by the change of impedance of the switching circuit 13" can be reduced.

Due to the structure described above, a radar signal generated by the voltage control oscillator 2 is subjected to amplitude modulation by the electric power amplifier 13' provided between the voltage control oscillator 2 and the transmission antenna 4.

This output signal strikes an object and is input into the receiver, along with a Doppler frequency shift corresponding to the relative velocity between the radar and the object and further along with a frequency shift caused by the delay time corresponding to the distance from the radar to the object.

Between the receiving antenna 6 and the first frequency converter 7, there is provided the switching circuit 13" which can conduct a switching operation synchronously with a modulation signal on the transmission side each time a portion of signal of the modulation signal generator 5, which generates a modulation signal to be sent to the electric power amplifier 13' on the transmission side is branched. Accordingly, the switching circuit 13" on the reception side functions as a gating circuit which is operated synchronously with a transmission signal. That is, a signal is received, only when the signal is sent from the transmission side. Other external signals are not received except for that time.

Accordingly, signal components which enter from the outside are not detected as noise. Therefore, the S/N ratio of the receiver can be further improved.

In the manner mentioned above, according to the third embodiment, approximately the same effects and advantages as those of the first and second embodiments can be provided, and further the S/N ratio of the receiver can be improved.

(d) Other Variations

In the aforementioned examples, amplitude modulation means other than the electric power amplifier 13' and the low noise amplifier 13 can be used for a modulator provided between the radar transmission section and the transmitting antenna, or between the radar reception section and the receiving antenna. Further, a switching circuit which conducts switching operation by the second frequency may be used. (In this case, the switching circuit modulates an amplitude into 0 or 1, so that this switching circuit can be considered to provide special amplitude modulation.) Furthermore, phase modulator can be used which conducts phase-modulation with the second frequency.

For example, one of the specific elements to compose the switching circuit is the PIN diode 20 shown in FIG. 12, or the switching circuit is realized when a drain current (a drain voltage) of a three-terminal element of a GaAs, MESFET or HEMT is switched.

As shown in FIG. 16, a balance type of switches circuit may be adopted in which two switching 3' (13") are connected by hybrids 11 so that the input and output impedance of the two switches 3' (13") can be maintained constant. When the aforementioned structure is provided, the change of impedance of the two switches 3' (13") does not affect the oscillation characteristics of the voltage control oscillator, so that the fluctuation of oscillation frequency of the voltage control oscillator, which is caused by the change of impedance of the two switches 3' (13"), and the fluctuation of output voltage can be reduced. Further, the fluctuation of frequency changing characteristics of the frequency converter which is caused when the impedance of the switching means 3' (13") is changed can be reduced.

Figure 13:
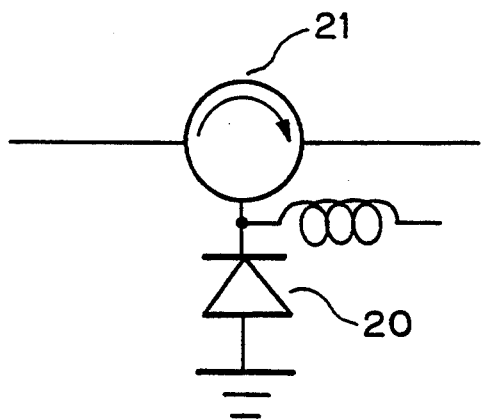
FIG. 13 is a view showing a phase modulator using a circulator.

As shown in FIG. 13, a circuit in which a PIN diode 20 and circulator 21 are combined is used for the phase modulator.

Incidentally, in each of the aforementioned embodiments, it is possible to use a rectangular wave as shown in FIG. 14, the duty of which is approximately 50%, for the second frequency. Due to the foregoing, the attenuation amount of a signal with respect to the electric power of the carrier can be minimized as compared with a case in which another waveform such as a sine wave and a triangular wave is used.

In the case where an interference waves exist, it is possible for the apparatus to receive only its own signal, so that an FM-CW radar apparatus which can withstand interference waves is composed.

Further, an FM-CW radar apparatus which only receives its own signal and withstands interference waves can be composed in the following manner. A frequency modulation wave formed on a rectangular wave is utilized for the output of the modulation signal generator 5. When an interference wave exists, the frequency (the period) of the frequency modulation wave is changed as shown in FIG. 15.

In the case where a modulation means other than the low noise amplifier 13 and the electric power amplifier 13' is used for the modulation means in the aforementioned first and third examples, the impedance on the output side of the voltage control oscillator can be maintained constant when an isolator is inserted between the voltage control oscillator and the modulator. When the apparatus is structured in the manner mentioned above, the change of impedance of the modulator does not affect the oscillation characteristics of the voltage control oscillator. Accordingly, the fluctuation of the oscillation frequency of the voltage control oscillator caused by the change of impedance of the modulator can be reduced, and the fluctuation of output power can be also reduced.

In the case where a modulator other than the electric power amplifier 13' is used in the aforementioned second embodiment, the input impedance of the first frequency converter is maintained constant when an isolator is inserted between the modulator and the first frequency changer. Due to the foregoing, the fluctuation of frequency changing characteristics of the frequency changer which is caused by the change of impedance of the modulator can be reduced.

As explained in detail for the various embodiments above, the present invention provides an FM-CW radar apparatus.

Consequently, it becomes possible to remove noise components from the reception circuit, wherein the noise components enters the reception circuit by the amplitude modulation component which is caused by the inclination of the oscillation frequency versus output power characteristics in the voltage control oscillator of the FM-CW radar apparatus. Due to the foregoing, the S/N ratio of the radar apparatus can be improved, and as a result, the present invention greatly contributes to the improvement in the performance of an FM-CW radar apparatus.

It is possible to use a modulation signal of a rectangular wave, with a duty of 50%. In this case, the attenuation amount of a signal with regard to the electric power of the carrier becomes minimum as compared with cases in which other waveforms (such as a sine wave or a triangular wave) are utilized.

When a rectangular modulation signal is used as a signal having the second frequency, it becomes possible to receive only its own signal in the case where interference waves exist. Consequently, an FM-CW radar apparatus which is not affected by interference can be composed.

When interference wave exists, it becomes possible to receive its own signal by changing the period of the aforementioned modulation wave. Consequently, an FM-CW radar which is not affected by interference can be composed.

Further, a balance type of switching circuit can be employed. In this case, the input and output impedance of the switching circuit can be maintained constant, so that the change of impedance of the modulator does not affect the oscillation characteristics of the voltage control oscillator. Therefore, the fluctuation of the oscillation frequency of the voltage control oscillator which is caused by the change of impedance of the modulator can be reduced, and the fluctuation of output power can be also reduced. Further, the fluctuation of frequency changing characteristics of the frequency converter which is caused by the change of impedance of the modulator can be reduced.

We claim:

1. A portable FM-CW radar device with transmit and receive antennas, comprising:
    a transmitting oscillator operatively coupled to the transmit antenna to transmit a modulated high frequency transmit signal at a first frequency from the transmit antenna in range of a target object so that a reflected signal is reflected by the target object;
    modulation signal generating means for generating a second frequency which is far lower than the first frequency and twice as much as a Doppler frequency generated by a sum or difference of a relative velocity of the reflected signal and the transmit signal and a beat frequency generated by a sum or difference of the propagation delay time of the reflected signal and the transmit signal;
    a modulator operatively connected between said transmitting oscillator and the transmit antenna to modulate the transmit signal;
    first frequency converting means for frequency modulating the reflected signal reflected by the target object with the first frequency; and
    second frequency converting means for frequency modulating the reflected signal with the second frequency.

2. The FM-CW radar device according to claim 1, wherein said modulator comprises a switching circuit, operatively connected to said modulation signal generating means, to switch in response to the second frequency.

3. The FM-CW radar device according to claim 2, wherein said switching circuit comprises a balanced type switch.

4. The FM-CW radar device according to claim 2, wherein said switching circuit comprises a PIN diode.

5. The FM-CW radar device according to claim 1, wherein said modulator comprises a phase-modulated modulator, operatively connected to said modulation signal generating means, to phase modulate in response to the second frequency.

6. The FM-CW radar device according to claim 1, wherein said modulation signal generating means comprises means for generating the second frequency as a rectangular wave of a duty factor of about 50%.

7. The FM-CW radar device according to claim 1, wherein said modulation signal generating means comprises means for generating the second frequency as a rectangular frequency-modulated wave.

8. The FM-CW radar device according to claim 7, wherein said modulation signal generating means further comprises means for varying a period of the rectangular frequency-modulated wave.

9. The FM-CW radar device according to claim 1, further comprising a band pass filter to pass the second frequency operatively connected between said first frequency converting means and said second frequency converting means.

10. The FM-CW radar device according to claim 1, further comprising a band pass filter having a pass band at the second frequency and operatively connected between said modulation signal generating means and said second frequency converting means.

11. The FM-CW radar device according to claim 1, further comprising an isolator operatively connected between said modulator and the transmitting oscillator.

12. The FM-CW radar device according to claim 1, wherein said second frequency converting means produces an output indicative of a relative velocity and a distance with respect to the target object which are simultaneously determined by said FM-CW radar device.

13. A portable FM-CW radar device with transmit and receive antennas, comprising:
a transmitting oscillator operatively coupled to the transmit antenna to transmit a modulated high frequency transmit signal at a first frequency from the transmit antenna in range of a target object so that a reflected signal is reflected by the target object;
modulation signal generating means for generating a second frequency which is far lower than the first frequency and a twice as much as a Doppler frequency generated by a sum or difference of a relative velocity of the reflected signal and the transmit signal and a beat frequency generated by a sum or difference of the propagation delay time of the reflected signal and the transmit signal;
a modulator operatively coupled to the receive antenna to modulate the reflected signal to produce a modulated reflected signal;
first frequency converting means for frequency modulating the modulated reflected signal with the first frequency; and
second frequency converting means for frequency modulating the modulated reflected signal with the second frequency.

14. The FM-CW radar device according to claim 2, further comprising an isolator operatively connected between said modulator and said first frequency converting means.

15. The FM-CW radar device according to claim 12, wherein said modulator comprises another switching circuit, operatively connected to said modulation signal generating means, to switch in response to the second frequency.

16. The FM-CW radar device according to claim 15, wherein said switching circuit comprises a balanced type switch.

17. The FM-CW radar device according to claim 15, wherein said switching circuit comprises a PIN diode.

18. The FM-CW radar device according to claim 12, wherein said modulator comprises a phase-modulated modulator, operatively connected to said modulation signal generating means, to phase modulate in response to the second frequency.

19. The FM-CW radar device according to claim 12, wherein said modulation signal generating means comprises means for generating said the second frequency as a rectangular wave of a duty factor of about 50%.

20. The FM-CW radar device according to claim 12, further comprising a band pass filter having a pass band at the second frequency and operatively connected between said modulation signal generating means and said second frequency converting means.

21. The FM-CW radar device according to claim 12, wherein said second frequency converting means produces an output indicative of a relative velocity and a distance with respect to the target object which are simultaneously determined by said FM-CW radar device.

22. A portable FM-CW radar device with transmit and receive antennas, comprising:
a transmitting oscillator operatively coupled to the transmit antenna to transmit a modulated high frequency transmit signal at a first frequency from the transmit antenna in range of a target object so that a reflected signal is reflected by the target object;
modulation signal generating means for generating a second frequency which is far lower than the first frequency and twice as much as a Doppler frequency generated by a sum or difference of a relative velocity of the reflected signal and the transmit signal and a beat frequency generated by a sum or difference of the propagation delay time of the reflected signal and the transmit signal;
a modulator operatively connected between said transmitting oscillator and the transmit antenna to modulate the transmit signal
a switching circuit operatively coupled to the receive antenna to switch the reflected signal to produce a modulated reflected signal;
first frequency converting means for frequency modulating the modulated reflected signal reflected by the target object with the first frequency; and
second frequency converting means for frequency modulating the modulated reflected signal with the second frequency.

23. The FM-CW radar device according to claim 22, further comprising an isolator operatively connected between said switching circuit and said first frequency converting means.

24. The FM-CW radar device according to claim 22, wherein said modulator comprises another switching circuit, operatively connected to said modulation signal generating means, to switch in response to the second frequency.

25. The FM-CW radar device according to claim 24, wherein said another switching circuit comprises a balanced type switch.

26. The FM-CW radar device according to claim 24, wherein said another switching circuit comprises a PIN diode.

27. The FM-CW radar device according to claim 22, wherein said modulator comprises a phase-modulated modulator, operatively connected to said modulation signal generating means, to phase modulate in response to the second frequency.

28. The FM-CW radar device according claim 22, wherein said modulation signal generating means comprises means for generating the second frequency as a rectangular wave of a duty factor of about 50%.

29. The FM-CW radar device according to claim 22, further comprising a band pass filter having a pass band at the second frequency and operatively connected between said modulation signal generating means and said second frequency converting means.

30. The FM-CW radar device according to claim 22, wherein said switching circuit comprises a balanced type switch.

31. The FM-CW radar device according to claim 22, wherein said switching circuit comprises a PIN diode.

32. The FM-CW radar device according to claim 3, wherein said second frequency converting means produces an output indicative of a relative velocity and a distance with respect to the target object which are simultaneously determined by said FM-CW radar device.

* * * * *

UNITED STATES PATENT AND TRADEMARK OFFICE
CERTIFICATE OF CORRECTION

PATENT NO. : 5,381,153
DATED : Jan. 10, 1995
INVENTOR(S) : Tamio Saito, et al

It is certified that error appears in the above-indentified patent and that said Letters Patent is hereby corrected as shown below:

Column 6, line 45, change "transmitting" to --receiving--;

line 59, change "This" to --A--.

Column 7, line 13, change "converting means" to --converter--;

line 44, change "side" to --side,--.

Column 8, line 5, delete "means of";

Column 9, line 11, change "switching means" to --switch--.

Column 13, line 16, delete "means";

line 37, change "means" to --circuit--.

UNITED STATES PATENT AND TRADEMARK OFFICE
CERTIFICATE OF CORRECTION

PATENT NO. : 5,381,153
DATED : Jan. 10, 1995
INVENTOR(S) : Tamio Saito, et al.

It is certified that error appears in the above-indentified patent and that said Letters Patent is hereby corrected as shown below:

Column 14, lines 67-68, change "switching means" to --two switches--.

Signed and Sealed this

Sixth Day of June, 1995

Attest:

BRUCE LEHMAN

*Attesting Officer*      *Commissioner of Patents and Trademarks*